(12) United States Patent
Masuda et al.

(10) Patent No.: US 11,025,074 B2
(45) Date of Patent: Jun. 1, 2021

(54) CHARGING MANAGEMENT APPARATUS

(71) Applicant: Toyota Jidosha Kabushiki Kaisha, Toyota (JP)

(72) Inventors: Tomokazu Masuda, Kasugai Aichi-ken (JP); Kenya Segawa, Okazaki Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 148 days.

(21) Appl. No.: 16/191,002

(22) Filed: Nov. 14, 2018

(65) Prior Publication Data

US 2019/0148957 A1 May 16, 2019

(30) Foreign Application Priority Data

Nov. 16, 2017 (JP) .............................. JP2017-220559

(51) Int. Cl.
*H02J 7/00* (2006.01)
*B60L 3/04* (2006.01)
*B60L 53/14* (2019.01)
*B60L 53/66* (2019.01)
*B60L 3/00* (2019.01)

(52) U.S. Cl.
CPC .............. *H02J 7/0026* (2013.01); *B60L 3/00* (2013.01); *B60L 3/04* (2013.01); *B60L 53/14* (2019.02); *B60L 53/66* (2019.02)

(58) Field of Classification Search
USPC ......................................................... 320/109
See application file for complete search history.

(56) References Cited

U.S. PATENT DOCUMENTS

| | | | | |
|---|---|---|---|---|
| 5,909,099 A | * | 6/1999 | Watanabe | H01F 38/14 320/108 |
| 5,917,307 A | * | 6/1999 | Watanabe | H01F 38/14 320/108 |
| 9,786,961 B2 | * | 10/2017 | Dyer | B60L 53/14 |
| 2012/0091954 A1 | * | 4/2012 | Matsuki | B60L 53/30 320/109 |
| 2012/0098490 A1 | * | 4/2012 | Masuda | B60L 7/14 320/109 |

(Continued)

FOREIGN PATENT DOCUMENTS

| JP | 2010-124578 A | 6/2010 |
|---|---|---|
| JP | 2012-209995 A | 10/2012 |

(Continued)

*Primary Examiner* — Samuel Berhanu
(74) *Attorney, Agent, or Firm* — Dinsmore & Shohl LLP

(57) ABSTRACT

An on-board charging management apparatus includes a vehicle-side earth line connected with an external-side earth line of an external power unit; a vehicle-side signal line connected with an external-side signal line of the external power unit; and a detection signal line configured to connect the vehicle-side signal line and the vehicle-side earth line. Presence or absence of a disconnection of the external-side earth line and the vehicle-side earth line is determined based on an electric current value or a voltage value of the detection signal line, when the external power unit is in a connected state. As a consequence, the on-board charging management apparatus can detect a disconnection of the earth line at the time of charging an on-board electric storage device.

12 Claims, 4 Drawing Sheets

(56) References Cited

U.S. PATENT DOCUMENTS

| | | | |
|---|---|---|---|
| 2013/0033224 A1* | 2/2013 | Raedy | B60L 53/124 |
| | | | 320/107 |
| 2013/0099740 A1* | 4/2013 | Takashima | B60L 53/66 |
| | | | 320/109 |
| 2014/0306658 A1* | 10/2014 | Kinomura | B60L 53/66 |
| | | | 320/109 |
| 2014/0368164 A1* | 12/2014 | Jung | H01F 38/14 |
| | | | 320/108 |
| 2015/0061584 A1* | 3/2015 | Okada | H02J 50/10 |
| | | | 320/108 |
| 2015/0137801 A1* | 5/2015 | Raedy | G01D 5/20 |
| | | | 324/207.15 |
| 2016/0159231 A1* | 6/2016 | Jefferies | B60L 53/16 |
| | | | 320/109 |
| 2016/0297310 A1 | 10/2016 | Kojima | |

FOREIGN PATENT DOCUMENTS

| | | |
|---|---|---|
| JP | 2016-201915 A | 12/2016 |
| JP | 2017-015635 A | 1/2017 |
| NO | 2010/150360 A1 | 12/2010 |

* cited by examiner

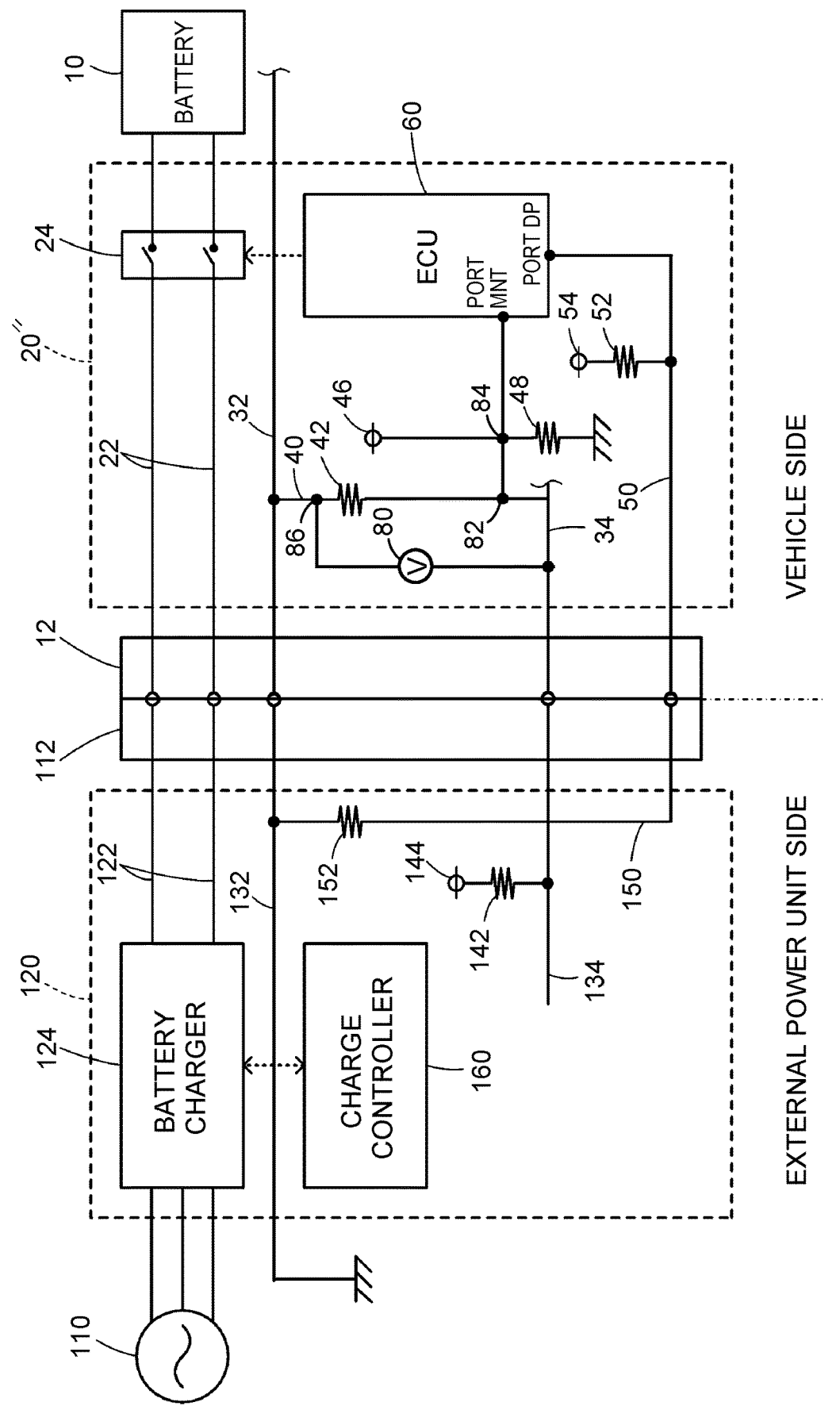

CHARGING MANAGEMENT APPARATUS

CROSS-REFERENCE TO RELATED APPLICATIONS

This application claims priority to Japanese Patent Application No. 2017-220559 filed on Nov. 16, 2017, which is incorporated herein by reference in its entirety.

BACKGROUND

1. Technical Field

The present disclosure relates to charging management apparatuses, and more particularly relates to an on-board charging management apparatus that charges an on-board electric storage device with electric power from an external power unit.

2. Description of Related Art

An apparatus has been proposed as a charging management apparatus of this type (see, for example, Japanese Patent Application Publication No. 2017-15635). The apparatus includes a disconnection detection circuit that detects a disconnection of an earth line in an external battery charger that charges a battery mounted on an electric motor vehicle using electric power of an external power source, the external battery charger being connected to a connector connected to the battery. The apparatus forms a bridge circuit between a control pilot line configured to transmit a pilot signal that controls charging of the battery and an earth line of the external battery charger, and detects an electric potential difference generated when the state of the bridge circuit changes from a balanced state to an unbalanced state so as to detect a disconnection of the earth line or the control pilot line.

SUMMARY

However, in the aforementioned charging management apparatus, the disconnection detection circuit that detects a disconnection of the earth line is incorporated in the external battery charger, and therefore the disconnection of the earth line cannot be detected on the vehicle side. When the on-board battery is charged with the electric power from the external power source, charging management may be performed by an on-board management apparatus. In that case, it is preferable-useful that a disconnection of the earth line at the time of charging be detected by the on-board management apparatus.

Accordingly, the present disclosure provides a charging management apparatus that detects a disconnection of an earth line with an on-board apparatus when an on-board electric storage device is charged with electric power of an external power source.

According to one aspect of the present disclosure, an on-board charging management apparatus that charges an on-board electric storage device with electric power from an external power unit is provided. The charging management apparatus includes a vehicle-side earth line, a vehicle-side signal line, a detection signal line, and a disconnection determination device. The vehicle-side earth line is connected with an external-side earth line of the external power unit. The vehicle-side signal line is connected with an external-side signal line of the external power unit. The detection signal line connects the vehicle-side signal line and the vehicle-side earth line. The disconnection determination device is configured to determine presence or absence of a disconnection of at least one of the external-side earth line or the vehicle-side earth line, based on a current value of the detection signal line or a voltage value of the detection signal line, when the external power unit is in a connected state.

The charging management apparatus of the present disclosure includes a vehicle-side earth line connected with an external-side earth line of the external power unit; a vehicle-side signal line connected with an external-side signal line of the external power unit; and a detection signal line configured to connect the vehicle-side signal line and the vehicle-side earth line. When the external power unit is in a connected state, i.e., when the external-side earth line and the vehicle-side earth line are in a connected state, and the external-side signal line and the vehicle-side signal line are in a connected state, the presence or absence of a disconnection of the external-side earth line or the vehicle-side earth line is determined, based on the electric current value or the voltage value of the detection signal line. The determination can be made based on a difference between an electric current value or a voltage value of the detection signal line when the external-side earth line and the vehicle-side earth line are in a connected state and an electric current value or a voltage value of the detection signal line when the detection signal line and the vehicle-side earth line are in a disconnected state. As a consequence, the on-board charging management apparatus can detect a disconnection of the earth line at the time of charging the on-board electric storage device with electric power from the external power unit. As a result, charging of the electric storage device can be managed on the vehicle side. Disconnections of the vehicle-side earth line that can be determined are those occurring outside a connection point between the vehicle-side earth line and the detection signal line.

In the charging management apparatus, the disconnection determination device may include a current detector or a voltage detector that detects an electric current or a voltage value of the detection signal line. When the electric current is not detected by the current detector, or when the voltage value is not detected by the voltage detector, the disconnection determination device may determine a disconnection of at least one of the external-side earth line and the vehicle-side earth line. At the time, a photo-coupler or an ammeter may be used as the current detector. As the voltage detector, a voltage sensor may be used.

In the charging management apparatus, the external-side signal line may be connected to a reference potential through an external-side resistance. The disconnection determination device may have, in the detection signal line, a vehicle-side resistance connected in series with the current detector or connected in parallel with the voltage detector.

According to the charging management apparatus as described in the foregoing, when the external-side earth line and the vehicle-side earth line are connected, electric current flows through the detection signal line since a voltage, obtained by dividing the reference potential by the external-side resistance and the vehicle-side resistance, acts on the external-side signal line and the vehicle-side signal line. Meanwhile, when the external-side earth line or the vehicle-side earth line is disconnected, electric current does not flow through the detection signal line since the external-side signal line, the vehicle-side signal line, the detection signal line, the external-side earth line, and the vehicle-side earth line are retained at the reference potential. Therefore, when electric current flows through the detection signal line, the disconnection determination device can determine that the external-side earth line and the vehicle-side earth line are connected, and when electric current does not flow through the detection signal line, the disconnection determination device can determine that the external-side earth line or the vehicle-side earth line is disconnected.

In the charging management apparatus, the disconnection determination device may be configured to prohibit charging, when a disconnection of at least one of the external-side earth line or the vehicle-side earth line is determined. The charging management apparatus as described in the foregoing can suppress inconveniences resulting from a disconnection of the external-side earth line or the vehicle-side earth line.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 is a block diagram illustrating the outlined configuration of a charging system focusing on a charging management apparatus as a second modification of the embodiment and an external power unit.

DETAILED DESCRIPTION OF EMBODIMENTS

Now, modes for carrying out the present disclosure will be described in detail based on an embodiment.

Figure 1:
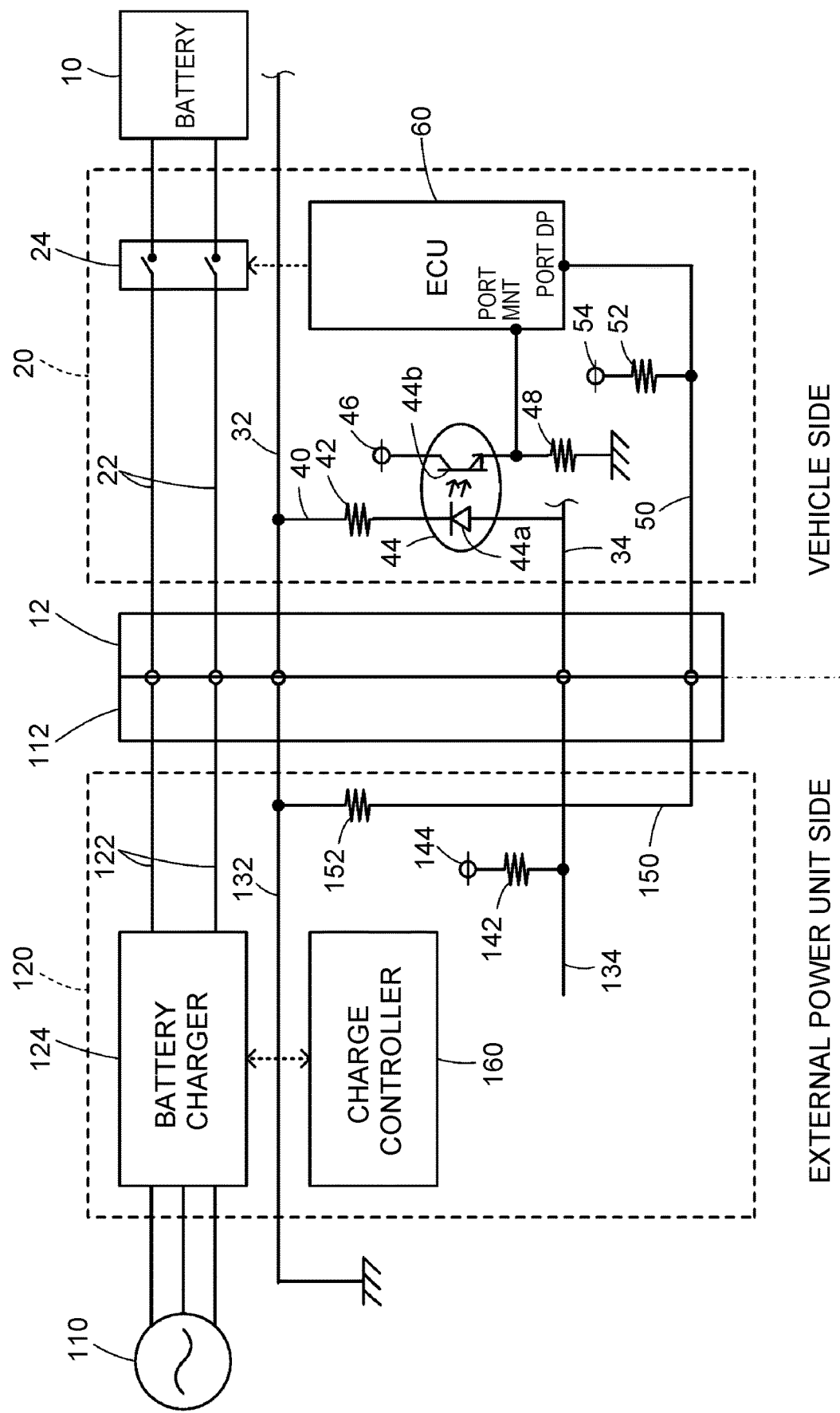
FIG. 1 is a block diagram illustrating the outlined configuration of a charging system focusing on a charging management apparatus as one embodiment of the present disclosure and an external power unit.

FIG. 1 is a block diagram illustrating an outlined configuration of a charging system focusing on a charging management apparatus 20 as one embodiment of the present disclosure and an external power unit 120. The illustrated charging system includes the charging management apparatus 20 for charging an on-board battery 10, the external power unit 120 that supplies to the charging management apparatus 20 electric power from an external power source 110 for charging the battery 10, a vehicle-side connector 12 that is connected to the charging management apparatus 20, and an external-side connector 112 that is connected to the vehicle-side connector 12.

The external power unit 120 includes a battery charger 124 and a charge controller 160. The battery charger 124 is connected to, for example, a three-phase alternating current external power source 110, and the charge controller 160 controls the battery charger 124. The battery charger 124 includes an AC-DC converter, a transformer, a DC-DC converter, and a relay. The battery charger 124 supplies charging electric power to an external-side charging electric power line 122. Although not illustrated, for example, the AC-DC converter converts three-phase alternating-current electric power into direct-current electric power, the transformer converts the voltage of the direct-current electric power from the AC-DC converter, and the DC-DC converter regulates the voltage of charging electric power in accordance with the state of charge of the battery 10. For example, the charge controller 160 is formed from a microcomputer mainly constituted of a CPU to perform drive control of the component members, such as the AC-DC converter, the DC-DC converter, and the relay of the battery charger 124. The external power unit 120 also includes a grounded external-side earth line 132, an external-side signal line 134 connected to a reference potential 144 through a resistance 142, and an external-side connection signal line 150 connected to the external-side earth line 132 through a resistance 152.

The charging management apparatus 20 includes a vehicle-side charging electric power line 22 connected to the external-side charging electric power line 122 and also connected to the battery 10 through a charge switch 24. The charging management apparatus 20 also includes an electronic control unit 60. The charging management apparatus 20 includes a vehicle-side earth line 32 connected to the external-side earth line 132, and a vehicle-side signal line 34 connected to the external-side signal line 134. The vehicle-side earth line 32 and the vehicle-side signal line 34 are connected through a detection signal line 40 including a resistance 42 and a photo-coupler 44 that are connected in series. The photo-coupler 44 is constituted of a light emitting diode 44a and a photo-transistor 44b, with the resistance 42 being serially connected to the light emitting diode 44a of the photo-coupler. The photo-transistor 44b is connected to a reference potential 46, and is grounded through the resistance 48. The voltage at a connection point between the photo-transistor 44b and the resistance 48 is input into the electronic control unit 60 as a monitor signal MNT. The charging management apparatus 20 includes a vehicle-side connection signal line 50 connected to the external-side connection signal line 150. The vehicle-side connection signal line 50 is connected to a reference potential 54 through a resistance 52, and the voltage at a connection point between the vehicle-side connection signal line 50 and the resistance 52 is input into the electronic control unit 60 as a connection signal DP.

The electronic control unit 60 is configured as a microcomputer mainly constituted of a CPU. Besides the CPU, the electronic control unit 60 includes a ROM, a RAM, a non-volatile RAM, and input-output ports which are not illustrated. Examples of the input port of the electronic control unit 60 include a port MNT and a port DP, into which the monitor signal MNT and the connection signal DP are input. From the output port of the electronic control unit 60, a driving control signal is output to the charge switch 24.

The electronic control unit 60 determines whether or not the vehicle-side connector 12 and the external-side connector 112 are connected, based on the connection signal DP. When the electric potential of the connection signal DP is equal to a reference potential, the electronic control unit 60 determines that the vehicle-side connector 12 and the external-side connector 112 are not connected. When the connection signal DP has an electric potential obtained by dividing the reference potential 54 by the resistance 52 and the resistance 152, the electronic control unit 60 determines that the vehicle-side connector 12 and the external-side connector 112 are connected.

The electronic control unit 60 determines whether or not, based on the monitor signal MNT, a disconnection occurs in a portion of the vehicle-side earth line 32 closer to the vehicle-side connector 12 than the connection point or in the external-side earth line 132 (hereinafter simply referred to as an "earth line"). When no disconnection occurs in the earth line, electric current flows through the detection signal line 40. Accordingly, the light emitting diode 44a of the photo-coupler 44 emits light, and the photo-transistor 44b is turned on. As a consequence, the voltage of the monitor signal MNT becomes identical to the reference potential 46. When a disconnection occurs in the earth line, electric current does not flow through the detection signal line 40. Accordingly, the light emitting diode 44a of the photo-coupler 44 does not emit light, and the photo-transistor 44b is turned off. Accordingly, the monitor signal MNT has a voltage identical to a ground potential (value). Therefore, when the monitor signal MNT has a voltage identical to the reference potential 46, the electronic control unit 60 determines that no disconnection occurs, whereas when the monitor signal MNT has a voltage identical to the ground potential (value zero), the electronic control unit 60 determines that a disconnection occurs.

Figure 2:
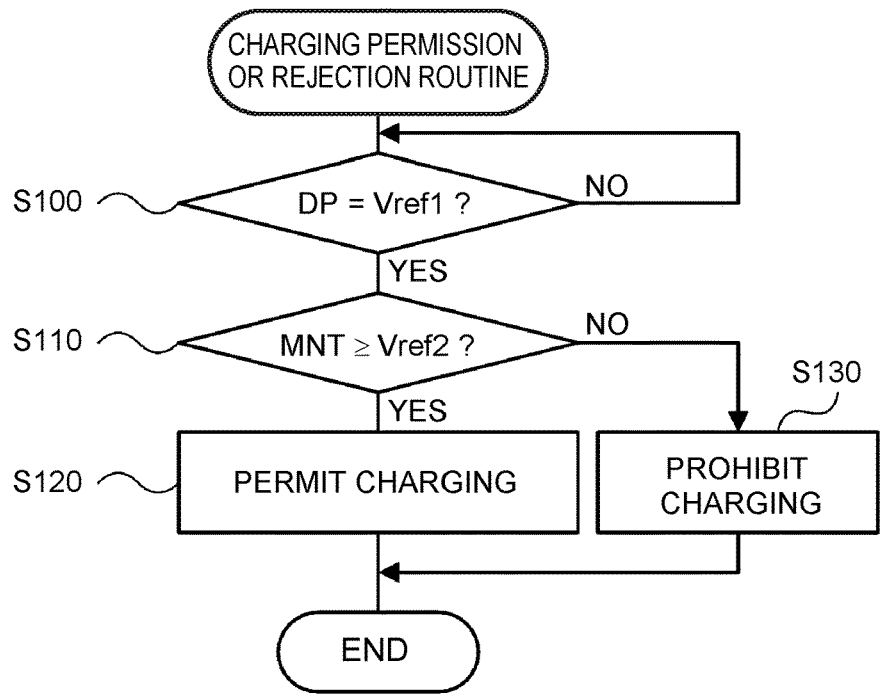
FIG. 2 is a flowchart illustrating one example of a charging permission or rejection routine executed by an electronic control unit.

A description is now given of the operation of the charging management apparatus 20 of the embodiment, particularly the operation at the time of permitting or rejecting the charging of the battery 10 based on whether or not a disconnection occurs in the earth line. FIG. 2 is a flowchart illustrating one example of a charging permission or rejection routine executed by the electronic control unit 60. The routine is executed when the vehicle-side connector 12 and the external-side connector 112 are connected.

When the charging permission or rejection routine is executed, the electronic control unit 60 determines whether or not the connection signal DP coincides with a voltage Vref1 as an electric potential obtained by dividing the reference potential 54 by the resistance 52 and the resistance 152 (step S100). When determining that the connection signal DP does not coincide with the voltage Vref1, the electronic control unit 60 determines that the vehicle-side connector 12 and the external-side connector 112 are not connected yet, and waits for the connection signal DP to coincide with the voltage Vref1. When determining that the connection signal DP coincides with the voltage Vref1, the electronic control unit 60 determines that the vehicle-side connector 12 and the external-side connector 112 are connected, and determines whether or not the monitor signal MNT is equal to or greater than a voltage Vref2 that is lower than the voltage of the reference potential 46 (step S110). When determining that the monitor signal MNT is equal to or greater than the voltage Vref2, the electronic control unit 60 determines that no disconnection occurs in the earth line. Accordingly, the electronic control unit 60 permits charging of the battery 10 (step S120), and ends the present routine. When charging of the battery 10 is permitted, the electronic control unit 60 confirms that there are no other abnormalities, and turns on the charge switch 24 to start charging of the battery 10. Meanwhile, when determining that the monitor signal MNT is less than the voltage Vref2, the electronic control unit 60 determines that a disconnection occurs in the earth line. Accordingly, the electronic control unit 60 prohibits charging of the battery 10 (step S130), and ends the present routine. In this case, since the charge switch 24 is not turned on, charging of the battery 10 is not performed.

Figure 3:
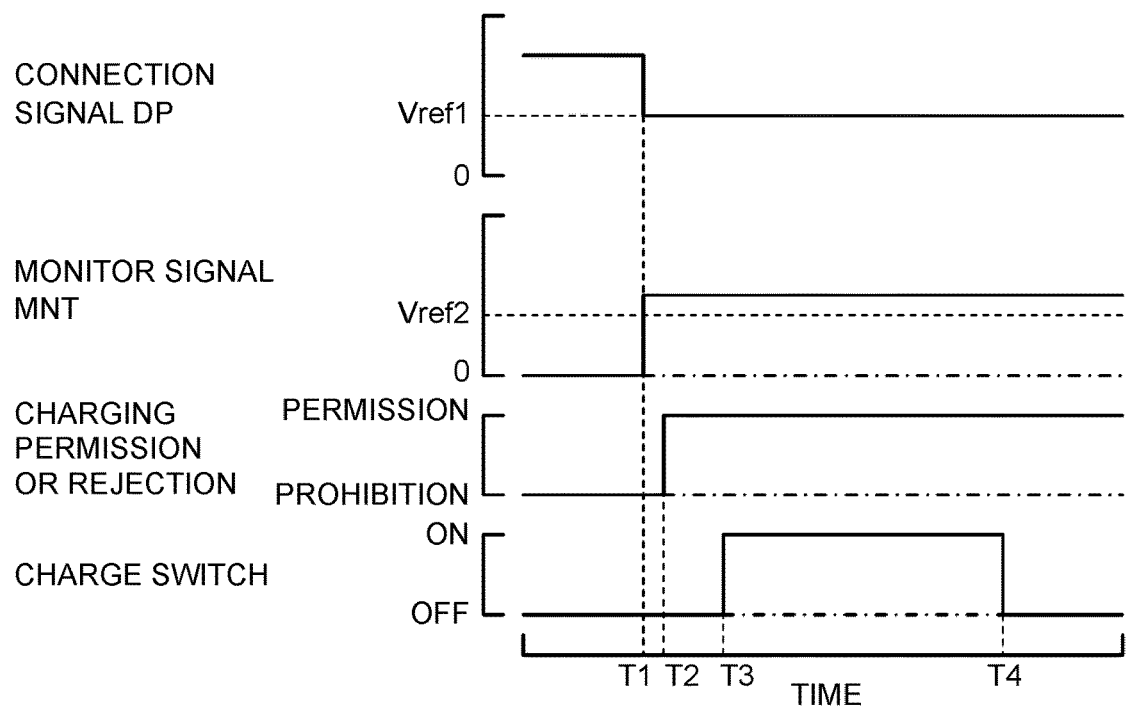
FIG. 3 is an explanatory view illustrating one example of time change in a connection signal, a monitor signal, charging permission or rejection, and a charge switch.

FIG. 3 is an explanatory view illustrating one example of time change in the connection signal DP, the monitor signal MNT, charging permission or rejection, and the charge switch 24. In FIG. 3, solid lines represent time change when no disconnection occurs, and dashed dotted lines represent time change when a disconnection occurs in the earth line. When no disconnection occurs in the earth line, the monitor signal MNT becomes equal to or greater than the voltage Vref2 at time T1 at which the connection signal DP is confirmed to coincide with the voltage Vref1. As a consequence, the charging permission or rejection routine permits charging at time T2, and turns on the charge switch 24 to start charging of the battery 10 at subsequent time T3. Once the charging of the battery 10 is ended (at time T4), the charge switch 24 is turned off. When a disconnection occurs in the earth line, the monitor signal MNT maintains a voltage less than the voltage Vref2 (value zero to be specific) even at time T1 at which the connection signal DP is confirmed to coincide with the voltage Vref1. Accordingly, the charging permission or rejection routine prohibits charging, and does not turn on the charge switch 24.

The charging management apparatus 20 of the embodiment described in the foregoing includes the vehicle-side earth line 32 connected to the external-side earth line 132, the vehicle-side signal line 34 connected to the external-side signal line 134 that is connected to the reference potential 144 through the resistance 142, and the detection signal line 40 that connects the vehicle-side earth line 32 and the vehicle-side signal line 34, the detection signal line 40 including the resistance 42 and the photo-coupler 44 connected in series. A signal indicating whether or not electric current flows through the detection signal line 40 is input as a monitor signal MNT by the photo-coupler 44. When electric current flows through the detection signal line 40, it is determined based on the monitor signal MNT that no disconnection occurs in the earth line. When electric current does not flow through the detection signal line 40, it is determined that a disconnection occurs in the earth line. As a consequence, the on-board charging management apparatus 20 can detect a disconnection of the earth line at the time of charging the battery 10 with electric power from the external power unit 120. When it is determined that no disconnection occurs in the earth line, the charging management apparatus 20 of the embodiment permits charging of the battery 10. When it is determined that a disconnection occurs in the earth line, the charging management apparatus 20 prohibits charging of the battery 10. As a consequence, it is possible to suppress inconveniences resulting from a disconnection of the earth line, such as damage of component members.

Figure 4:
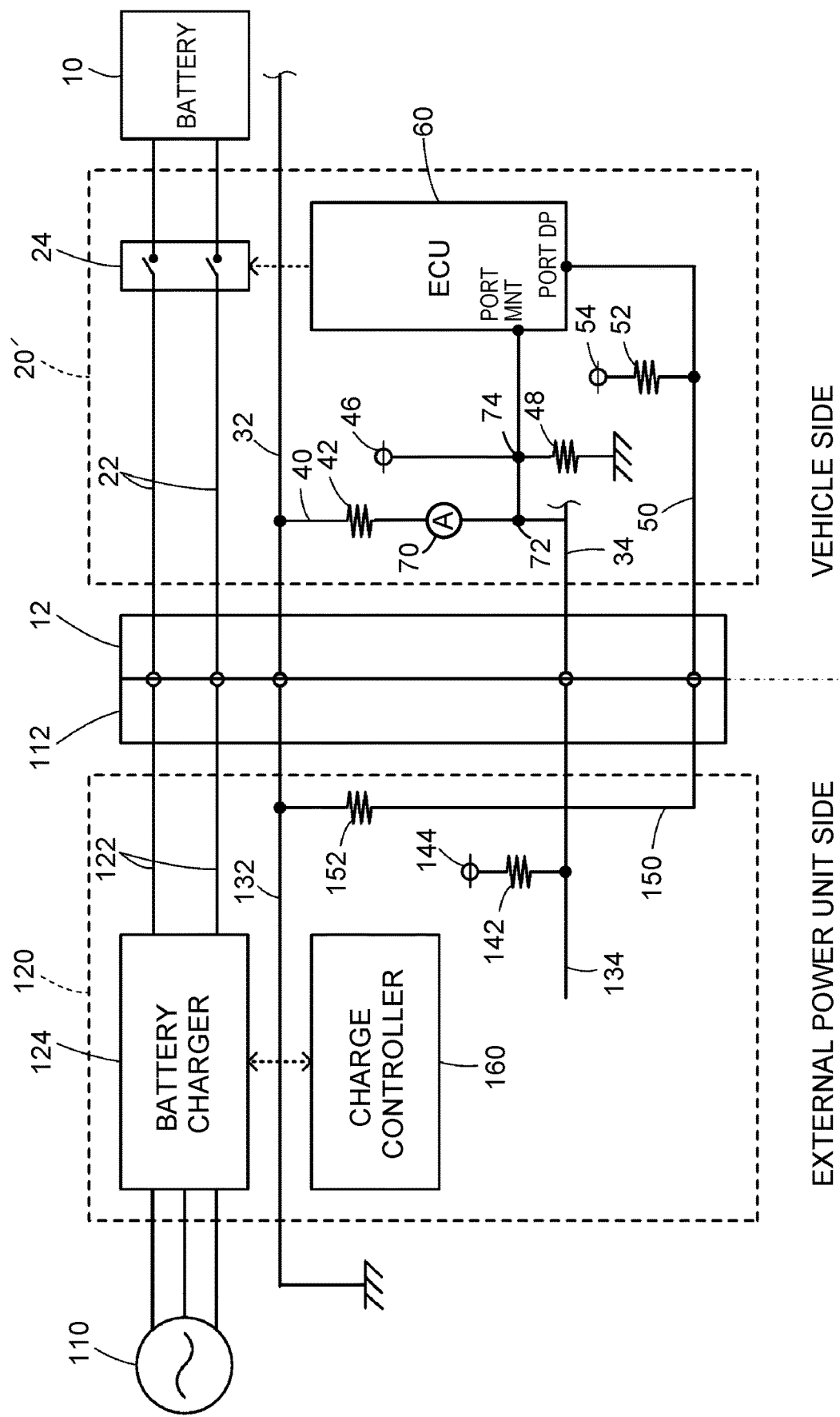
FIG. 4 is a block diagram illustrating the outlined configuration of a charging system focusing on a charging management apparatus as a first modification of the embodiment and an external power unit.

The charging management apparatus 20 of the embodiment determines whether or not a disconnection occurs in the earth line by detecting whether or not electric current flows through the detection signal line 40 with the photo-coupler 44. However, in a charging management apparatus 20' which is shown in FIG. 4, as a first modification of the embodiment, an ammeter 70 is used in place of the photo-coupler 44. In the first modification, the ammeter 70 is disposed between the resistance 42 and the vehicle-side signal line 34, in place of the photo-coupler 44. A connection point 72 between the ammeter 70 and the vehicle-side signal line 34 is connected to a connection point 74 between the reference potential 46 and the resistance 48. Furthermore, the connection point 74 is connected to the port MNT. In the first modification, when the electric current value which is detected by the ammeter 70 is substantially zero, it is determined that the disconnection occurs in the earth line, and when the electric current value which is detected by the ammeter 70 is not substantially zero, it is determined that the disconnection does not occur in the earth line.

Since whether or not a disconnection occurs in the earth line can be determined based on the electric potential between the resistance 42 of the detection signal line 40 and the vehicle-side signal line 34. Accordingly, in a charging management apparatus 20" which is shown in FIG. 5, as a second modification of the embodiment, whether or not a disconnection occurs in the earth line may be determined based on the detection value of a voltage sensor 80 that detects the electric potential between the resistance 42 and the vehicle-side signal line 34. In the second modification, the voltage sensor 80 is disposed between the vehicle-side signal line 34 and a connection point 86 which is disposed on the detection signal line 40 between the resistance 42 and the vehicle-side earth line 32, in place of the photo-coupler 44. A connection point 82 between the voltage sensor 80 and the vehicle-side signal line 34 is connected to a connection point 84 between the reference potential 46 and the resistance 48. Furthermore, the connection point 84 is connected to the port MNT. In the second modification, when the voltage value which is detected by the voltage sensor 80 is substantially zero, it is determined that the disconnection occurs in the earth line, and when the voltage value which is detected by the voltage sensor 80 is not substantially zero, it is determined that the disconnection does not occur in the earth line.

Although the external power unit 120 includes the battery charger 124 in the charging system of the embodiment, the first modification and the second modification, the on-board charging management apparatus 20 may include the battery charger.

A description is given of a correspondence relation between main elements of the embodiment, the first modification and the second modification and main elements of the present disclosure described in "SUMMARY." In the embodiment, the first modification and the second modification, the battery 10 is one example of the "electric storage device." The vehicle-side earth line 32 is one example of the "vehicle-side earth line." The vehicle-side signal line 34 is one example of the "vehicle-side signal line." The detection signal line 40 is one example of the "detection signal line." The resistance 42, the photo-coupler 44 or the ammeter 70 or the voltage sensor 80, the reference potential 46, the resistance 48, and the electronic control unit 60 are examples of the "disconnection determination device." The external power unit 120 is one example of the "external power unit." The external-side earth line 132 is one example of the "external-side earth line." The external-side signal line 134 is one example of the "external-side signal line."

Since the correspondence relation between the main elements of the embodiment, the first modification and the second modification and the main elements of the present disclosure described in "SUMMARY" is one example to provide a specific description of the modes for carrying out the present disclosure described in "SUMMARY", the correspondence relation is not intended to limit the elements of the disclosure described in "SUMMARY". More specifically, the disclosure described in "SUMMARY" should be interpreted based on the description therein, and the embodiment, the first modification and the second modification is merely a specific example of the disclosure disclosed in "SUMMARY."

Although the modes for carrying out the present disclosure have been described using the embodiment, the first modification and the second modification, the present disclosure is not limited in any manner to the embodiment, the first modification and the second modification disclosed. It should naturally be understood that the present disclosure can be carried out in various modes without departing from the scope of the present disclosure.

The present disclosure is applicable in the fields such as manufacturing of the charging management apparatuses.

What is claimed is:

1. An on-board charging management apparatus that charges an on-board electric storage device with electric power from an external power unit, the charging management apparatus comprising:
   a vehicle-side earth line connected with an external-side earth line of the external power unit;
   an external-side connection signal line connected to the external-side earth line on an external power unit side, the external-side connection signal line is connected with a vehicle-side connection signal line;
   a vehicle-side signal line connected with an external-side signal line of the external power unit;
   a detection signal line positioned on a vehicle side and configured to connect the vehicle-side signal line and the vehicle-side earth line; and
   a disconnection determination device configured to determine presence or absence of a disconnection of at least one of the external-side earth line or the vehicle-side earth line, based on an electric current value of the detection signal line, when the external power unit is in a connected state based on an electric current value of the external-side connection signal line.

2. The charging management apparatus according to claim 1,
   wherein the disconnection determination device includes a current detector configured to detect electric current flowing through the detection signal line, and
   wherein the disconnection determination device is configured to determine a disconnection of at least one of the external-side earth line or the vehicle-side earth line, when the electric current is not detected by the current detector.

3. The charging management apparatus according to claim 2, wherein the current detector is a photo-coupler.

4. The charging management apparatus according to claim 2, wherein the current detector is an ammeter.

5. The charging management apparatus according to claim 2,
   wherein the external-side signal line is connected to a reference potential through an external-side resistance, and
   wherein the disconnection determination device includes a vehicle-side resistance connected to the detection signal line in series with the current detector.

6. The charging management apparatus according to claim 1, wherein the disconnection determination device is configured to prohibit charging, when a disconnection of the external-side earth line, the vehicle-side earth line, or the external-side earth line and the vehicle-side earth line is determined.

7. The charging management apparatus according to claim 2, wherein the current detector is a photo-coupler configured to display whether or not an electric current flows through the detection signal line.

8. An on-board charging management apparatus that charges an on-board electric storage device with electric power from an external power unit, the charging management apparatus comprising:
   a vehicle-side earth line connected with an external-side earth line of the external power unit;
   an external-side connection signal line connected to the external-side earth line on an external power unit side, the external-side connection signal line is connected with a vehicle-side connection signal line;

a vehicle-side signal line connected with an external-side signal line of the external power unit;

a detection signal line positioned on a vehicle side and configured to connect the vehicle-side signal line and the vehicle-side earth line; and a disconnection determination device configured to determine presence or absence of a disconnection of at least one of the external-side earth line or the vehicle-side earth line, based on a voltage value of the detection signal line, when the external power unit is in a connected state based on an electric voltage value of the external-side connection signal line.

9. The charging management apparatus according to claim 8, wherein the disconnection determination device includes a voltage detector configured to detect the voltage value of the detection signal line, and wherein the disconnection determination device is configured to determine a disconnection of at least one of the external-side earth line or the vehicle-side earth line, when the voltage value is not detected by the voltage detector.

10. The charging management apparatus according to claim 9, wherein the voltage detector is a voltage sensor.

11. The charging management apparatus according to claim 9, wherein the external-side signal line is connected to a reference potential through an external-side resistance, and wherein the disconnection determination device includes a vehicle-side resistance connected to the detection signal line in parallel with the voltage detector.

12. The charging management apparatus according to claim 8, wherein the disconnection determination device is configured to prohibit charging, when a disconnection of at least one of the external-side earth line or the vehicle-side earth line is determined.

* * * * *